May 8, 1956  R. A. HUGUENIN  2,744,417
MACHINE GEAR WHEELS
Filed Nov. 24, 1950  3 Sheets-Sheet 1

Inventor
R. A. Huguenin
By Glenn Downing Rubell
Attys.

May 8, 1956  R. A. HUGUENIN  2,744,417
MACHINE GEAR WHEELS
Filed Nov. 24, 1950  3 Sheets-Sheet 2

Inventor
R. A. Huguenin

May 8, 1956   R. A. HUGUENIN   2,744,417
MACHINE GEAR WHEELS
Filed Nov. 24, 1950   3 Sheets-Sheet 3

Inventor
R. A. Huguenin

United States Patent Office 2,744,417
Patented May 8, 1956

2,744,417

MACHINE GEAR WHEELS

Robert Auguste Huguenin, Paris, France

Application November 24, 1950, Serial No. 197,345

Claims priority, application France October 24, 1950

2 Claims. (Cl. 74—434)

Machine gear wheels are so designed and machined that the surfaces of the teeth in meshing engagement will roll naturally on one another with the least possible objectionable sliding friction when a torque is transmitted between two separate axles.

The rules of design and construction known up to the present are based exclusively on purely geometrical and cinematical considerations.

These conventional bases of design and manufacture do not account for the fact that in operation a movable gear part is never in such a state of absolute elastic inertia in its mass as is a detached solid body.

Therefore the present invention has for an object to mitigate accelerated wear of gear teeth and to render the operation of gearing noiseless and in addition to improve the evenness of rolling contact or engagement between the teeth, particularly of high speed and high powered gearing.

The invention will be more particularly described with reference to the accompanying drawings in which:

Figure 13 illustrates in section a further modification of the invention as applied to the shape of the flanks of a gear, while;

Figures 14 and 15 illustrate alternative knurlings applicable to the flanks of the gear illustrated in Figure 13, while;

Figure 16 is a fragmentary section taken along lines 63—64 of either Figures 14 or 15;

Figure 17 illustrates a further modification where the invention is applicable to the end faces of the shafts of the gear element, while;

Figure 1:
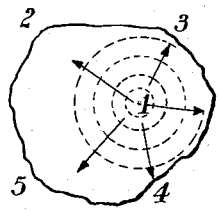
Figures 1 and 2 are fragmentary diagrammatic theoretical illustrations.
Figure 2:
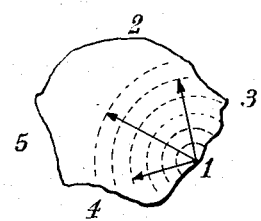

Referring to Figures 1 and 2 of the appended drawing which show two plane sections of one and the same solid body defined by the perimeters 2, 3, 4, 5, every momentary deformation of the material within a small volume of the solid body in the vicinity of point 1 in said body, the said point 1 is located within the body in Figure 1 and close to its surface in Figure 2, will temporarily convert said point 1 into a centre of emission of elastic radiations which propagate wtihin the solid body. The elastic radiations diverge around the point 1. In the planes of Figures 1 and 2 such a radiation is represented diagrammatically by a series of circles of increasing radii having their centre at 1. The arrows indicate, in the planes of Figures 1 and 2 and for a few axes of propagation, the initial directions of the speeds of propagation of the elastic disturbance arising from point 1.

As any portion of the surface of a gear wheel tooth comes into engagement with a tooth of the companion movable member, the force resulting from the mutual contact of the teeth generates a family of particular momentary deformations by which not only a zone of the crust of the tooth in engagement but also a whole internal slice of the movable member to which said tooth belongs are effected. Ipso facto, as the fraction of tooth surface considered, comes into meshing engagement and for a little while thereafter, an internal volume of the movable solid and separately each point in said volume becomes a centre of emission of various elastic radiations or vibrations which propagate within the solid material which constitutes the movable body to which the tooth belongs.

Consequently, from the viewpoint of resiliency phenomena, the material constituting a gear element must be regarded as being at all points thereof in an absolutely permanent state of local agitation, and so is almost generally the superficial layer of the sea, which theoretically is plane, and also the earth's crust, notably from the viewpoint of micro-earthquakes.

As a result of these facts, the surfaces of gear wheel teeth cannot in anyway be regarded, when the teeth are in action or engaging movement, as being congealed in those states of geometrical definition which characterize them either when they are completely at rest or under the action of purely static deforming stresses.

As a consequence of the unceasing generation of elastic energy and of its unceasing dissipation through the mass of each gear element in operation, objectionable relative displacements occur between the bearing surfaces of either tooth of the pair momentarily in engagement with each other, which displacements may interfere with their theoretical rolling on each other and may generate, in their relative motion, important slipping components, all the more as they are attended with considerable friction.

The present invention makes it possible in all circumstances to mitigate the detrimental consequences of the internal elastic radiation which attends the meshing engagement, and this, by facilitating the dissipation of the elastic energy towards the outside of the movable members in order to decrease the permanent rate of accumulation of the said energy within the rotating solids.

Elastic radiation within solid bodies is governed by physical laws of propagation which are more general than those of light in transparent media on the one hand and than those of sound waves in material media on the other hand. However, in the three cases, a portion of the incident energy will be reflected by the boundary surface between two media in which the speeds of propagation of the radiation are unequal, back into the first medium while another portion will pass into the second medium.

If it is desired to lessen the amount of energy which flows back into the medium in which the elastic radiation is generated it is advisable to provide for maximum continuity in the variation of the speed of propagation of the radiation between the said medium and the receiving medium.

The researches that led to the present invention have established that this result can be attained in a practically satisfactory manner by interposing a simple thin sheet between the two bodies considered, which sheet is made of a material in which the speed of propagation of the elastic radiation is intermediate between the speeds of propagation of said radiation in the one and the other of the bodies considered. Still more effective is a composite sheet constituted by several juxtaposed layers made of materials in which the speeds of propagation of the elastic radiation vary progressively in the same direction from one layer to the next one.

A fundamental characteristic of the present invention—which derives from these observations—consists in lining the non-stressed surfaces of gear elements in general, that is, those surfaces of said elements which do not pertain to the effective faces of the teeth proper, with a simple or composite material plating which is so chosen that the speed or speeds of propagation of the elastic radiation through said plating are comprised between the speeds of propagation of said radiation respectively in the material from which said movable elements are made and in the air or any other fluid in which they are immersed.

This method, which is characteristic of the invention and the domain of application of which is extremely diverse, may be carried into effect in many different embodiments which all remain within the scope of the invention and several examples of which are given hereinafter without any limiting character.

Figure 3:
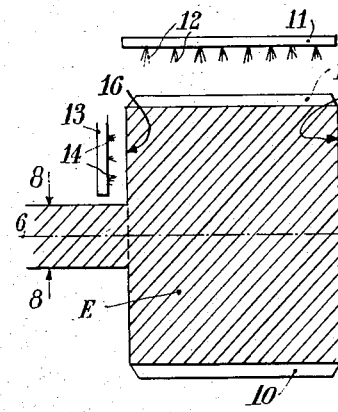
Figures 3 to 7 illustrate several modifications in which the objects of the invention are obtained by provision of a lining between the non-active surfaces of the gear and the medium in which the gear will operate and which lining has certain definite characteristics.

A first example is illustrated in Figure 3 which illustrates a movable gear element E, rotatable about an axis 6, 7, provided with a shaft 8, 9, and with a peripheral set of teeth 10.

In the case of a force-feed-lubricated gear set, an oil-feed rack 11 would provide for the conventional lubrication of the teeth, as with the aid of a series of oil jets 12.

According to the invention, any desired lubricating device whether conventional or not has associated therewith a pair of side force-feed oil racks 13, the jets 14 of which sprinkle the flanks 15 and 16 of the movable gear element between the peripheral set of teeth 10 and the carrying shaft 8, 9.

The speeds of propagation of the elastic waves within the movable solid E are of the order of several thousand metres per second. In air, one single speed prevails which approximates 350 metres per second. In lubricating oils it may be estimated that the speed of the elastic waves is about 1,400 metres per second. The oil film maintained on the sides 15, 16, of the movable body assists the emergence of the internal elastic radiation from the body E into the air and thereby decreases its rate of accumulation in said body.

Figure 4:
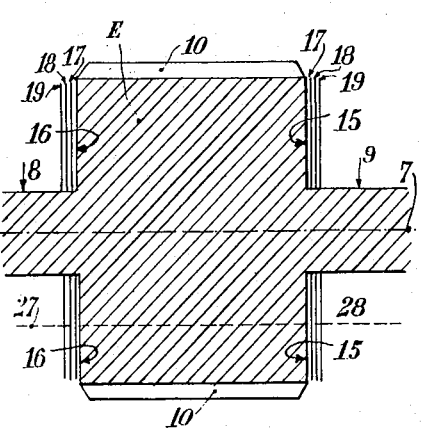

In the embodiment shown in Figure 4, the gear element E is provided on each of its noneffective sides or flanks 15, 16 with an adherent solid deposit consisting of thin layers 17, 18, 19, of different successive materials chosen in view of the progressively decreasing speed of propagation of the elastic radiation therethrough.

For instance, in the case of a steel element E, copper might be chosen for layer 17, tin for layer 18 and lead for layer 19.

The number of successive layers is not limited.

The shapes to be given to the sides 15 and 16 in order to secure satisfactory adhesion and cohesion in operation of the affixed linings are extremely variable.

Figure 5:
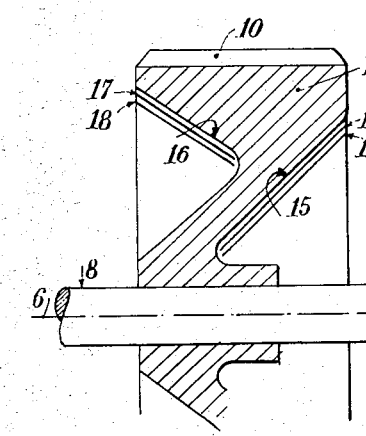

Figure 5 gives an example of shapes for the sides of movable elements, which shapes are chosen with a view of automatically providing for a satisfactory mechanical behaviour of the lining 17—18 (assumed to be comparatively little resistant) in spite of the centrifugal forces exerted thereupon.

In this example, in the course of the rotation, the thin sheets 17 and 18 are pressed by the centrifugal force against the flanks 15 and 16 of the movable member owing to the very shape of said flanks.

Figure 6:
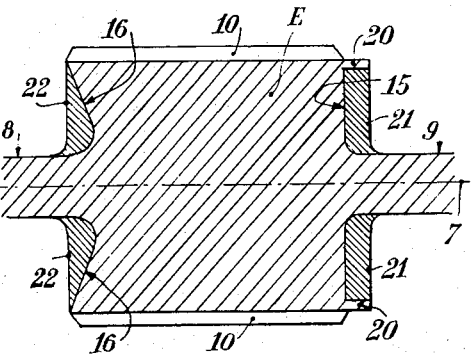

Figure 6 illustrates further examples of solid linings applied on the sides of movable gear elements. In this example, the flank 15, at the right, is hollowed out in cup-like shape, leaving an external cylindrical shoulder 20. A material 21, of the kind of that which constitutes the aforementioned linings, is deposited in the cup-like recess. Applied to the opposite flank 16, is a massive side deposit 22, the thickness of which in its cylindrical sections increase progressively towards the shaft 8—9. An inherent mechanical cohesive strength is thus conferred upon the said deposit which approximates that of a solid of uniform strength in rotation.

The materials, shapes and types of linings may vary according to the centrifugal forces to be resisted in each particular gear application.

In the matter of lining the flanks 15 and 16 it remains within the scope of the invention to utilize any suitable method, such as casting, or dipping in a molten bath, or electrolysis, or spraying with an air gun, and so on.

A further feature of the invention consists in spraying a final external coating with the aid of an air gun, the coating having a comparatively porous structure and consequently being able to become soaked with lubricating oil and to improve the adhesion of the latter to metals.

Figure 7:
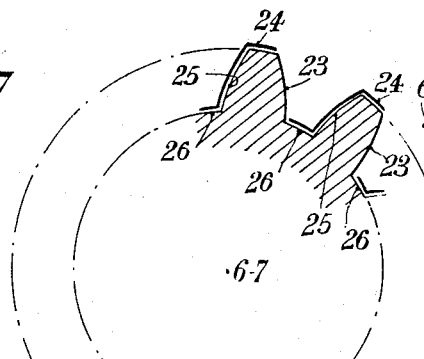

Figure 7 represents a movable gear element according to the invention in fractional cross sectional view taken at right angles to its axis of rotation 6—7. Visible in said sectional view is the outline 26, 25—24, 23 of two successive teeth. The line 23 of each tooth outline is assumed to constitute the working face of the tooth.

The other portions 24, 25, 26, of the sectional outline of the movable element are defined by double lines in order to materialize the fact that, within, the scope of the invention, the non-engaged surfaces of the element, just the same as the sides of said element, may be coated with a layer of a solid material having a speed of elastic radiation comprised between the speeds of said radiation propagation respectively of the material of which the gear element is made and the speed of radiation propagation of the lubricating oil. Such a coating can be obtained easily, a specific example, in the case of a steel or gunmetal gear element, consisting simply of a tinning thereof.

Further features of the invention, which may or not be utilized in combination with the ones described hereinbefore, are derived from the following observations:

It is well known that fluids in general and more particularly air and lubricating oil will only transmit those elastic radiations in which vibration occurs longitudinally, that is in which the oscillations of the material are directed exclusively collinear with the axis of the ray which is propagating.

The consequence is that every other component of the elastic radiation within the movable element, which is carried by a radiation axis and contained in a plane at right angles to the ray refracted within the oil or the air outside the movable element, will be reflected back into the latter.

Where the gear element comprises a pair of opposite plane and parallel boundary surfaces or sides, that is both of which surfaces are simultaneously intersected by an axis of propagation at right angles thereto, any elastic energy that radiates as waves parallel with said surface and propagating in the direction of such an axis will have no chance of escaping into the surrounding fluids. Since the meshing process generates elastic radiations which are continuously renewed, an accumulation of objectionable energy will finally occur within the element considered which will be trapped between the two planes considered.

Such would be the case, for instance (see Figure 4), in all directions 27—28 parallel with the axis of rotation 6—7 in the gear element since the sides 15, 16 of the latter constitute boundary surfaces and are plane and parallel with the axis 6—7.

A further fundamental feature of the invention consists precisely in eliminating such an accumulation of objectionable energy by the substitution for the usually plane and parallel opposite portions of the sides delimiting gear elements, by surfaces which depart geometrically, by any desired property, from the said plane and parallel portions.

These special flanks of gear elements may be, for instance yet not limited to, surfaces of continuous variation, that is, cones or other conic sections of revolution or coarsely or finely discontinuous complex surfaces.

Figure 8:
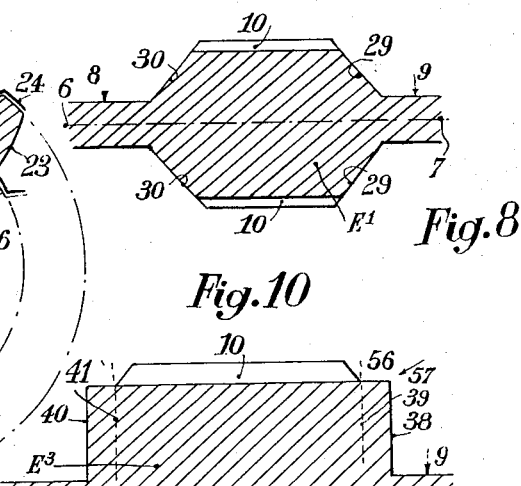
Figures 8 and 9 illustrate a further modification in which the object of the invention is obtained by the particular formation of the non-active surfaces of the gear.

For instance, Figure 8 shows the flanks 29 and 30 of a movable element $E^1$ shaped as regular cones with opposite circular bases. The said cones, which are collinear with the axis of rotation 6—7 and the total angle of aperture of which may be of the order of 150° to 160° are substituted for the plane and parallel flanks represented in Figures 3 and 4.

Figures 9, 10, 12:
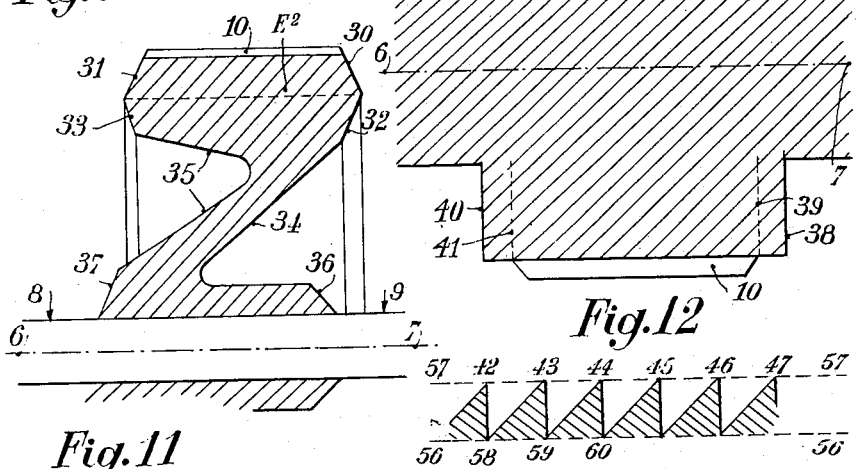
Figures 10 to 12 illustrate a further modification in sectional view, partial side elevation in a developed partial plane respectively.

Figure 9 illustrates a further example of the invention in which no elementary surface is left, on the opposite flanks of the movable gear element, which is parallel with any one surface located on the opposite side.

In this example, starting from the teeth in the direction of the shaft 8—9, the flanks of the movable element $E^2$ consist of a system of multiple cones the slopes of which are successively reversed. Immediately below the set of teeth 10 are provided the cones 30 and 31. Towards the shaft 8—9, a system of cones 32 and 33, the slopes of which are reversed with respect to the cones 30 and 31, extend the lateral flanks of the movable element.

Any desired number of successive stages of cones flaring alternatedly in the one and the other direction may be provided.

In the said example, according to Figure 9, the end faces of the web are delimited by a pair of cones 35 and 34 having unequal apex angles.

The fact that the web of a movable gear element is delimited by two cones which are not parallel with each other is a particular feature of the invention. Even the end faces 37 and 36, of the hub around the shaft 8—9, are of conical surfaces with reverted slopes.

Figure 11:
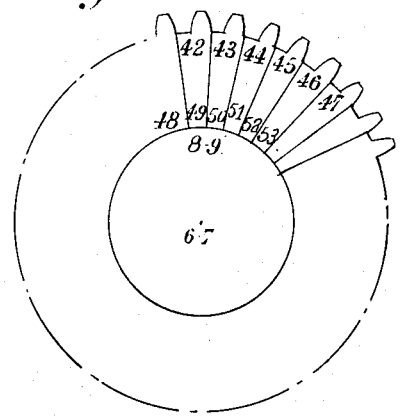

Figures 10, 11 and 12 illustrate a further system of movable gear element having flanks of the coarsely discontinuous surface type.

A movable gear element $E^3$, provided with a shaft 8—9 having its axis located at 6—7 is illustrated in Figure 10, and gear is formed with teeth 10 and has its sides 38—39, 40—41, machined to a substantial depth.

The said sides, in fact, are composed of successive radial grooves.

In Figure 11, the movable element is represented in end view taken at right angles to the axis 6—7. The flank of the movable member appears as limited at the front thereof by a series of successive radial edges, 42—48, 43—49, 44—50, 45—51, 46—52, 47—53, and so forth.

By developing the cylinder 56, 57 of Figure 10 on a plane as shown in Figure 12 an image is obtained of the close grooves which characterize the machined side. It will be appreciated that each groove is limited by two planes, of which the one extends through the axis of rotation 6—7 and its trace on cylinder 56—57 is given by one of the straight lines 42—58, 43—59, 44—60, of Figure 12, while the other plane is at an angle to the former and its trace, Figure 12, on the development of the cylinder 56, 57 is given by one of the parallel lines 58—43, 59—44, 60—45, and so on.

The physical obtainment of such a set of radial grooves in the flanks of movable elements encounters no difficulties.

A system of gear element flanks having finely discontinuous surfaces is illustrated, by way of example, in Figures 13, 14, 15 and 16.

Figure 13:
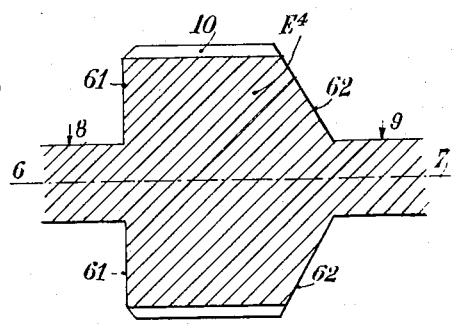

According to Figure 13, the flanks of the movable gear element $E^4$ are machined initially as plane surfaces 61, or conical surfaces 62.

Thereafter they are recessed with the aid of a knurling tool. Once the sides of the movable element are knurled, they appear, in end view in a direction parallel with the axis 6—7 thereof, as partly indicated in Figures 14 and 15.

Figure 14:
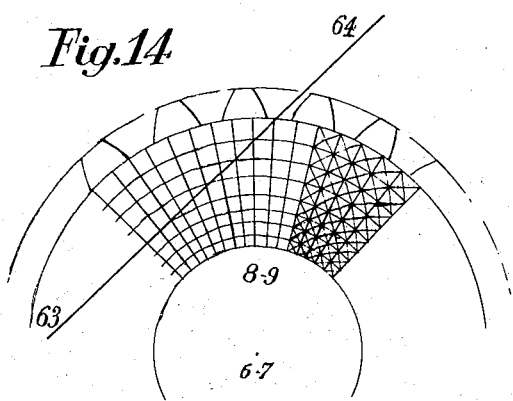

In this manner, the initially plane surfaces 61 or conical surfaces 62 are provided with close prominences located between grooves, substantially identical and of the type of quadrangular-base pyramids. As shown in Figure 14, these hollow pyramids are arranged both circularly and radially with respect to one another. According to Figure 15, the knurling tool is so designed that all the pyramids knurled out are offset angularly the extent of 45° about their axes; the grooves constitute a double system of imbricated spirals.

Figure 15:
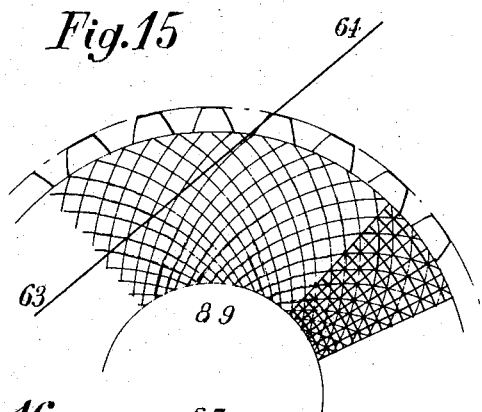

By sectioning such movable elements by a plane parallel with the axis 6—7 and having its trace at 63—64 on the plane of Figures 14 and 15, a section of the element flank in the said plane is obtained which appears as a finely serrated line composed of close triangles. Such a section is represented between 63 and 64 in Figure 16.

This type of finely discontinuous surface affords the additional advantage that a good adhesion is given to the oil where the said surfaces are used in their bare state or to the metal or like linings which may be deposited thereon to complement the sides of the movable member according to the characteristics described previously.

Within the scope of the invention, the various parts of a movable gear element may be subjected separately either to any one of the aforementioned processes or to a combination or a superposition of several of said processes on one and the same flank of the element or on the non-stressed portions of the teeth.

Figures 16, 17:
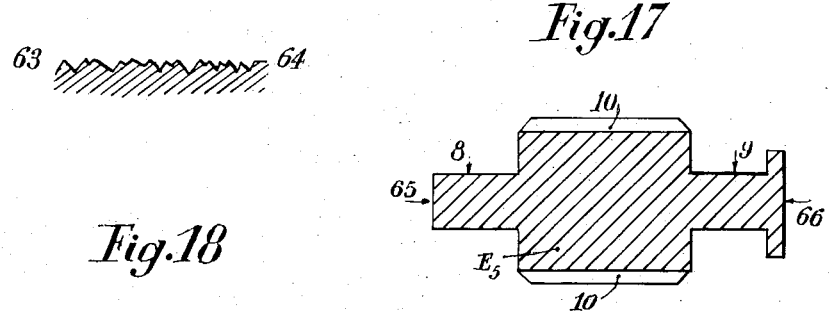

Besides, in this respect, the notion of gear element flank extends to the ends 65, 66, of the shaft 8, 9 Figure 17. Likewise, both and/or either of the two said ends 65 and 66, of the element, $E^5$, may be treated in one of the aforesaid ways or by a combination or superposition of the same in order that the elastic energy within the element may be dissipated more easily also through the ends of the shaft 8, 9.

Figure 18:
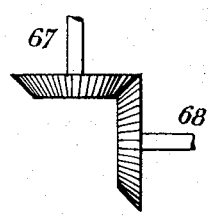
Figure 18 is a diagrammatic illustration of the invention as applicable to bevel gearing.

Although throughout the drawings and for the sake of simplicity in the disclosure, the figures are only concerned with the case of axially parallel gear elements, the present invention is also applicable in all its features to any kind of bevel gears irrespective of their angular position, a non-limiting example of this being shown in Figure 18 in which the axes of rotation 67, 68, are directed at right angles to each other.

The invention also extends to gear sets in which the one element is a worm and quite generally to any toothed element belonging to a gear set of any possible kind, internal gear, planetary gear, and so on, irrespective of the power to be transmitted thereby.

I claim:

1. A gear wheel comprising a thick disc having peripheral teeth, said disc having annular troughs extending into the same from opposite sides thereof and said disc further including a hub defining portion having a journalling aperture therethrough, the sides of the hub defining portion being inclined toward one another and of unequal length and angle of inclination, the respective troughs having different radii from the center of the disc and walls of unequal length, and the side surfaces of the disc between the outermost wall of each trough and the teeth each presenting multiple faces at least one of which on each side of the disc is inclined outwardly and another of which is inclined inwardly toward the teeth.

2. A gear wheel comprising a disc having peripheral teeth and a hub journalling aperture therethrough, said disc having annular troughs extending into the same from opposite sides thereof, said troughs being of different widths and having surfaces at an angle to one another, the area of the opposite sides of the gear from each trough toward the axis of the hub journalling aperture constituting conical surfaces disposed so that a continuation of these surfaces toward the periphery would meet within the body of the gear at a point laterally displaced from the central median plane of the gear and the area of the opposite sides of the gear between the troughs and the teeth each constituting oppositely inclined surfaces having apices on opposite sides of the gear lying in a common cylinder passing through the gear.

References Cited in the file of this patent

UNITED STATES PATENTS

| | | |
|---|---|---|
| 1,271,140 | Dickey | July 2, 1918 |
| 1,334,844 | Day | Mar. 23, 1920 |
| 1,530,072 | Church | Mar. 17, 1925 |
| 1,803,296 | Bethune | Apr. 28, 1931 |
| 1,804,906 | Wemp | May 12, 1931 |
| 1,813,819 | Ross | July 7, 1931 |
| 1,819,266 | Rued | Aug. 18, 1931 |
| 1,852,789 | Peterson | Apr. 5, 1932 |
| 2,114,982 | Jackson | Apr. 19, 1938 |
| 2,129,178 | Jordan | Sept. 6, 1938 |
| 2,207,290 | Hale | July 9, 1940 |

FOREIGN PATENTS

| | | |
|---|---|---|
| 2,700 | Great Britain | July 13, 1877 |
| 424,701 | Great Britain | Feb. 27, 1935 |
| 571,901 | Germany | Mar. 7, 1933 |